US008625141B2

(12) United States Patent
Gobeyn et al.

(10) Patent No.: US 8,625,141 B2
(45) Date of Patent: Jan. 7, 2014

(54) CONFIGURING A MODULAR PRINTING SYSTEM (75) Inventors: Kevin Michael Gobeyn, Rochester, NY (US); Joseph Anthony Manico, Rochester, NY (US); Christopher M. Muir, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 295 days.

(21) Appl. No.: 13/240,051

(22) Filed: Sep. 22, 2011

(65) Prior Publication Data
US 2013/0077126 A1 Mar. 28, 2013

(51) Int. Cl.
*H04N 1/40* (2006.01)
*G06F 15/00* (2006.01)

(52) U.S. Cl.
USPC ............. 358/1.15; 358/1.9; 358/3.24; 347/17

(58) Field of Classification Search
USPC ................... 358/1.15, 468, 1.9, 3.24; 347/17; 400/76, 582
See application file for complete search history.

(56) References Cited

U.S. PATENT DOCUMENTS

| 4,535,892 | A | * | 8/1985 | Roes et al. | 209/3.3 |
|---|---|---|---|---|---|
| 4,853,869 | A | * | 8/1989 | Durst et al. | 700/227 |
| 5,079,438 | A | * | 1/1992 | Heung | 307/141 |
| 5,390,910 | A | * | 2/1995 | Mandel et al. | 271/296 |
| 5,697,297 | A | * | 12/1997 | Rasmussen | 101/219 |
| 6,003,979 | A | | 12/1999 | Schneider et al. | |
| 6,394,572 | B1 | * | 5/2002 | Pierce et al. | 347/17 |
| 7,236,934 | B1 | * | 6/2007 | Mayes | 705/300 |
| 2002/0027574 | A1 | * | 3/2002 | Kao et al. | 347/17 |
| 2002/0102121 | A1 | * | 8/2002 | Shaw et al. | 400/582 |
| 2003/0053108 | A1 | * | 3/2003 | Clough et al. | 358/1.14 |
| 2011/0128337 | A1 | | 6/2011 | Muir et al. | |
| 2011/0128338 | A1 | | 6/2011 | DeCook et al. | |

* cited by examiner

*Primary Examiner* — Jerome Grant, II
(74) *Attorney, Agent, or Firm* — Raymond L. Owens (57) ABSTRACT A method for configuring a modular printing system is disclosed. The system has a plurality of modules that are configured to be selectively interconnected to form different printing system configurations. The method includes providing printing system modules and associated configuration information for each module; selecting and interconnecting modules to produce a particular printing system configuration and communicating the associated configuration information for the selected modules to a system controller; and using the system controller to automatically determine a printing system configuration that includes operational parameter ranges for at least one of the selected modules. The method further includes storing the printing system configuration so that the modular printing system is ready to operate.

11 Claims, 6 Drawing Sheets

CONFIGURING A MODULAR PRINTING SYSTEM

CROSS REFERENCE TO RELATED APPLICATION

Reference is made to commonly assigned U.S. patent application Ser. No. 13/240,112 filed concurrently herewith, entitled "Operating a Selectively Interconnected Modular Printing System" by Kevin M. Gobeyn et al, the disclosure of which is incorporated herein.

FIELD OF THE INVENTION

The present invention relates to a method for configuring a modular printing system, having a plurality of modules that are configured to be selectively interconnected to form different printing system configurations.

The present invention generally relates to printing apparatus for web media and more particularly relates to non-contact printing that uses a configurable, modular arrangement of components.

BACKGROUND OF THE INVENTION

Continuous web printing permits economical, high-speed, high-volume print reproduction. In this type of printing, a continuous web of paper or other substrate material is fed past one or more printing subsystems that form images by applying one or more colorants onto the substrate surface. This type of printing has a number of advantages over conventional web printing methods. In a conventional web-fed rotary press, for example, a web substrate is fed through one or more impression cylinders that perform contact printing, transferring ink from an imaging roller onto the web in a continuous manner. These earlier contact printing systems tend to have heavy frame structures, precision-designed components, and complex and costly alignment procedures for precisely adjusting substrate transport between components and subsystems. For this reason, conventional contact-printing systems generally have fixed configurations, with equipment designs that are specific for a restricted range of printing applications and relatively narrow range of media and ink types.

With recent advances in inkjet printing technology, non-contact printing has demonstrated capabilities for high-speed continuous web printing with suitable image quality and provides a range of features that support improvements in equipment flexibility, adaptability, and efficiency. These techniques are disclosed in U.S. Patent Application Publication 2011/0128337 entitled "Media Transport System For Non-Contact Printing", by Muir et al. Using digitally controlled print-heads that direct fine dots of ink across an air gap and onto the rapidly moving print media, non-contact printing offers a number of advantages not available with these earlier contact-printing systems. Because impression rollers with attached printing plates are not used with these systems, the design of such systems permits more flexibility than was previously available in terms of colorants and other liquids that can be applied, operating speeds, permitted media types, sizes, print formats, and other attributes. In addition, because print content is not transferred from a contacting roller, the printing format/layout of a non-contact digital printing is not limited by an impression roller diameter.

As non-contact printing systems are being developed, a number of design advantages present themselves, including interchangeability of components and modular design. Modular design permits a printing system to be configured or re-configured from a set of standard components, so that the same basic printing system can have a number of different configurations. These techniques are disclosed in U.S. Patent Application Publication 2011/0128338 entitled "Modular Media Transport System", by DeCook et al. Techniques for web media handling between modules, such as "kinematic" or "exact constraint" mechanical interfaces simplify the task of aligning the media path between one modular component and another. The design of the present invention is well suited to take advantage of systems that make use of exact constraint web handling that make it feasible to re-configure a modular arrangement in a timely and economical manner.

Conventional solutions for adapting a printer to a particular print job or set of printing conditions include feedback loops and similar control arrangements, often with the help of pre-defined "job ticket" parameter sets or templates that can be selectable for a particular print job. These conventional approaches can work well with dedicated and smaller-scale print apparatus that have a narrow range of capabilities and where interoperability of modular components is not needed. Such conventional solutions, however, can fall far short of what is needed in order to support high-speed modular web media printing systems. Some factors affecting interoperability for a modular system can include differences in acceptable media transport speed for various modules; drying time requirements; response time needed at different modules for changing speed or other parameters; environmental factors such as heat and humidity that can affect applied inks and media handling, receptivity, and drying time; colorant density and number of inks or other colorants or fluids used by a job; data processing speeds, media types and properties; and other factors. In a large-scale printing system that is designed to handle different types of print jobs, the number of operational factors that can be varied and possible combinations of parameters that can be used can well exceed the practical limits of pre-defined template parameter sets and exceed the capabilities of interactive control loops or other conventional mechanisms for adapting and interoperability between components.

In order to meet the needs of a dynamic printing market, high-speed non-contact digital printers must provide the capability to be configurable from modular components, and the various capabilities and performance of each modular component must be taken into account at a system level. Thus, there is a need for apparatus and methods that permits modular system configuration and that adapt system operational control to the combined capabilities of the individual modular components.

SUMMARY OF THE INVENTION

The present invention relates to an effective way to configure printing modules. In accordance with the present invention a method is provided for configuring a modular printing system, having a plurality of modules that are configured to be selectively interconnected to form different printing system configurations comprising:

providing printing system modules and associated configuration information for each module;

selecting and interconnecting modules to produce a particular printing system configuration and communicating the associated configuration information for the selected modules to a system controller;

using the system controller to automatically determine a printing system configuration that includes operational parameter ranges for at least one of the selected modules; and storing the printing system configuration so that the modular printing system is ready to operate.

It is a feature of the present invention that in systems where there is a plurality of different printing modules they can be effectively combined to form different printing configurations that are suitable for different printing applications. It is also a feature of the present invention that it adapts operation of the printing system to the configuration of component modules that are selectively interconnected to form a particular printing system.

It is an advantage of the present invention that it permits straightforward configuration of a system from individual modular components and determines system capabilities according to information obtained from each component.

DETAILED DESCRIPTION OF THE INVENTION

The method and apparatus of the present invention help enables an operator to take full advantage of a modular approach to the design of a digital printing system. It automatically identifies a suitable range of operational parameters and selections that can be made available for an operator based on the selected configuration of modular components that are interconnected to form a particular printing system. In the drawings and text that follow, like components are designated with like reference numerals, and similar descriptions concerning components and arrangement or interaction of components already described are omitted. Where they are used, the terms "first", "second", and so on, do not denote any ordinal or priority relation, but are simply used to more clearly distinguish one element from another. Drawings are provided in order to illustrate and emphasize important concepts and are not necessarily drawn to scale.

The apparatus and methods of the present invention are particularly well suited for printing apparatus that provide non-contact application of ink or other colorant onto a continuously moving web medium. The print-head of such a system selectively moistens at least some portion of the media as it courses through the printing system, but without the need to make contact with the print media. Examples of non-contact printing include continuous inkjet printing or drop on demand inkjet printing. In the context of the present disclosure, the term "continuous web of print media" refers to a continuously moving sheet medium that serves as the receiving print medium onto which colorant is applied in a non-contact fashion. This is to be distinguished from various types of "continuous webs" or "belts" that are actually transport system components, such as toner transfer belts or fuser belts, rather than receiving print media and that are typically used to transport a cut sheet medium within an electro-photographic or other printing system. The terms "upstream" and "downstream" are terms of art referring to relative positions along the transport path of a moving web. The term "print job" is a term of art that relates to that portion of a print run that produces one or more versions of a given document.

In the context of the present invention, the term "module" refers broadly to a component of a printing system that supports the supply, printing, finishing, or process conditioning of the web print media in some manner. Modules of a printing system can include various items of equipment such as media suppliers, marking components (e.g. ink), media transport system components, marking engines, environmental conditioning units, (e.g. dryers, chillers, exhaust fans), and media finishing equipment, such as slitters, folding equipment, binding equipment, coating and lamination apparatus, and other components that handle the media, whether unprinted, in the process of being printed upon, or in some post-printing operation stage. A basic set of modules required for a simple printer configuration would include a media supply, single color printer module, and take-up modules arranged in that order. Beyond this basic set and configuration of modules required for printing, additional modules can be selectively interconnected upon initial installation or at any time after initial installation to accommodate the particular printing requirements. The modular configuration can be changed to accommodate a special print job requiring a special media or treatment to the print media, a change in the nature of the printing service provided by printing operation, or to rapidly exchange a module to correct a component failure. Additional modules, such as multicolor printers, radiant energy dryers, forced-air dryers, slack loops, UV curing units, web position monitoring and control systems, as well as an array of finishing modules such as cutters, slitters, stackers, collators, and various binding systems can be added to enhance the capabilities and performance of the selectively configured printer. In addition, modules of a print system can also include data processing and handling components that are in the image data path as well as control and interface components, and components that provide various types of metadata that is either associated with the digital image data or with the printing system or process itself. In addition, modules of a print system can include a broad range of available media and ink components and types that have varying characteristics and features including; ink viscosity, ink lay down, media porosity, paper based media and plastic based media, pigmented inks, aqueous inks, and solvent inks.

As the term would be recognized and used by those skilled in the printing process, a modular arrangement implies a measure of interchangeability and configurability, so that one modular component can be configured to be compatible with another modular component in some way. Modular components with the same function are generally considered to be at least somewhat interchangeable, so that, for example, an alternate printer module, an alternate print-head assembly, or an alternate dryer could be substituted in the place of a given component when configuring a print system. Given this broad understanding, a "modular printing system" is a system that provides printing capability by selectively combining two or more modular components to form a particular printing system.

Embodiments of the present invention generate information that is stored in computer-accessible memory 66. Computer-accessible memory 66 can be a memory storage device used for longer term storage, such as a device using magnetic, optical, or other data storage media. In addition, the computer-accessible memory 66 can include an electronic memory such as a random access memory (RAM) that is used for shorter term storage, such as circuitry employed to store a computer program having instructions for controlling one or more computers to practice the method according to the present invention. The term "memory" as used herein can also refer to a display buffer, data register, computation workspace, or other electronic circuitry that is used to temporarily store data that is displayed on a display screen or used in calculation for example.

Figure 1:
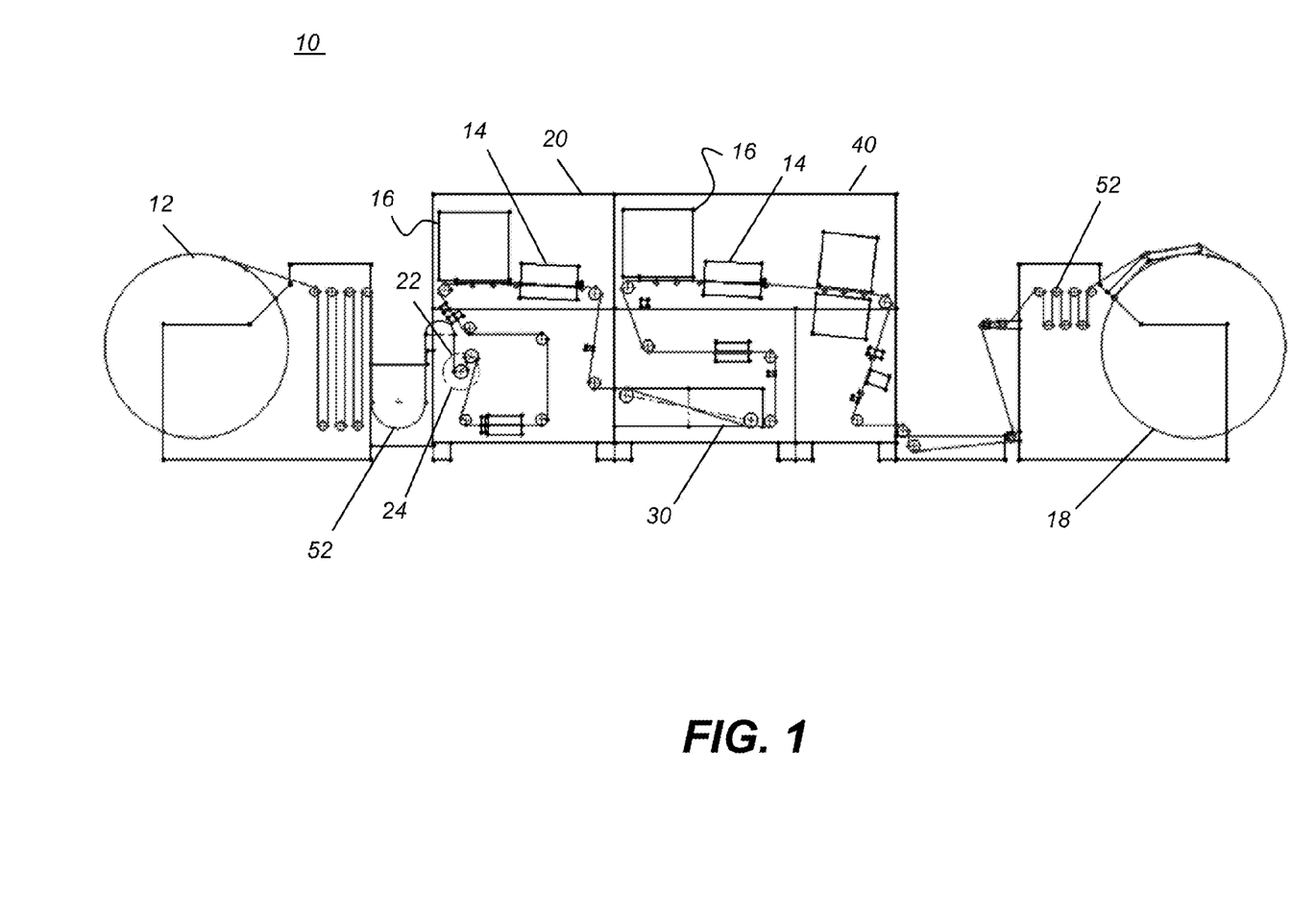
FIG. 1 is a schematic side view of a digital printing system according to an embodiment of the present invention.

Referring to the schematic side view of FIG. 1, there is shown a digital printing system 10 for continuous web printing according to a commercial printing embodiment. A first module 20 and a second module 40 are provided for guiding continuous web media that originates from a source roller 12. Following an initial slack loop 52, the media that is fed from source roller 12 is then directed through digital printing system 10, past one or more digital print-heads 16 and supporting printing system 10 components, such as a dryer 14. First module 20 has a support structure that typically includes web guidance features such as an edge guide or other cross-track positioning mechanism 22 for positioning the continuously moving web of print media in the cross-track direction, orthogonal to the direction of travel and in the plane of travel, and a tensioning mechanism 24 that sets the tension of the print media.

Downstream from first module 20 along the path of the continuous web media, second module 40 also has a support structure and components that cooperate with first module 20 to maintain the kinematic dynamics of the continuous web of print media in traveling from the first module 20 into the second module 40. Printing system 10 optionally also includes a turnover mechanism 30 that is configured to turn the media over, flipping it backside-up in order to permit printing on the reverse side. A take-up roll 18 is then formed, rewound from the printed web media. One or more slack loops 52 can also be provided towards the take-up end to facilitate drying, to reduce binding, to compensate for any differential transport speeds between modules, or to compensate for differential acceleration or deceleration of the paper transport. The printing mechanism can include a number of other components, including multiple print heads and dryers, for example, as described in more detail subsequently.

The modularity of a printing system, such as printing system 10 in FIG. 1, enables two or more printing modules 20 and 40 to be connected together in order to provide particular printing capabilities. Module 20 is a four-color printer in one embodiment, applying precisely registered ink dots of cyan, magenta, yellow, and black (CMYK) in sequence onto the moving web print media, then drying the newly printed media at dryer 14. Module 20 then passes the printed web to module 40 that flips the media over and performs CMYK printing onto the opposite side of the media. Other operations are also possible, including application of fewer or additional colors, application of laminates or other fluids or coatings, use of slitters or perforating devices, and use of components that provide various types of printing preparation or finishing operations.

It order to better understand aspects of the present invention that support interoperability of modular printing system components, it is instructive to distinguish "module configuration data" from "system configuration data", as these terms are used in the present disclosure.

Module Configuration Data

Each individual module 20, 40 in the modular printing system 10 has some amount of associated module configuration data. In the context of the present invention, the term "module configuration data" is used to encompass the various types of information that are associated with each module 20, 40. For modular printing system 10 in FIG. 1, for example, associated module configuration data includes data that describes module type, capabilities, module requirements, including module order requirements. This can include various data about the equipment itself, such as its overall function, model and type, power requirements, weight or required floor strength, order requirements in the sequence of media handling as installed in the system, and other physical and dimensional data. Other examples of module configuration data include the number and printing order of colors and ink types supplied; range of available transport speed settings; current settings and available range for variables such as web media thickness, stiffness, or width; capabilities of supporting components such as dryers, chillers, and the like; ventilation and exhaust requirements; and other configuration data. Examples of media information that is also considered module configuration data include media porosity, tensile strength, beam strength, thickness, color, and surface characteristics. Examples of ink information include viscosity and amount of water or solvent content.

Alternatively, measurement data from one or more sensors provided in modular printing system 10 can provide module configuration data. This is useful when media or ink characteristics are unknown and can be helpful for monitoring ambient printing conditions.

Figure 2:
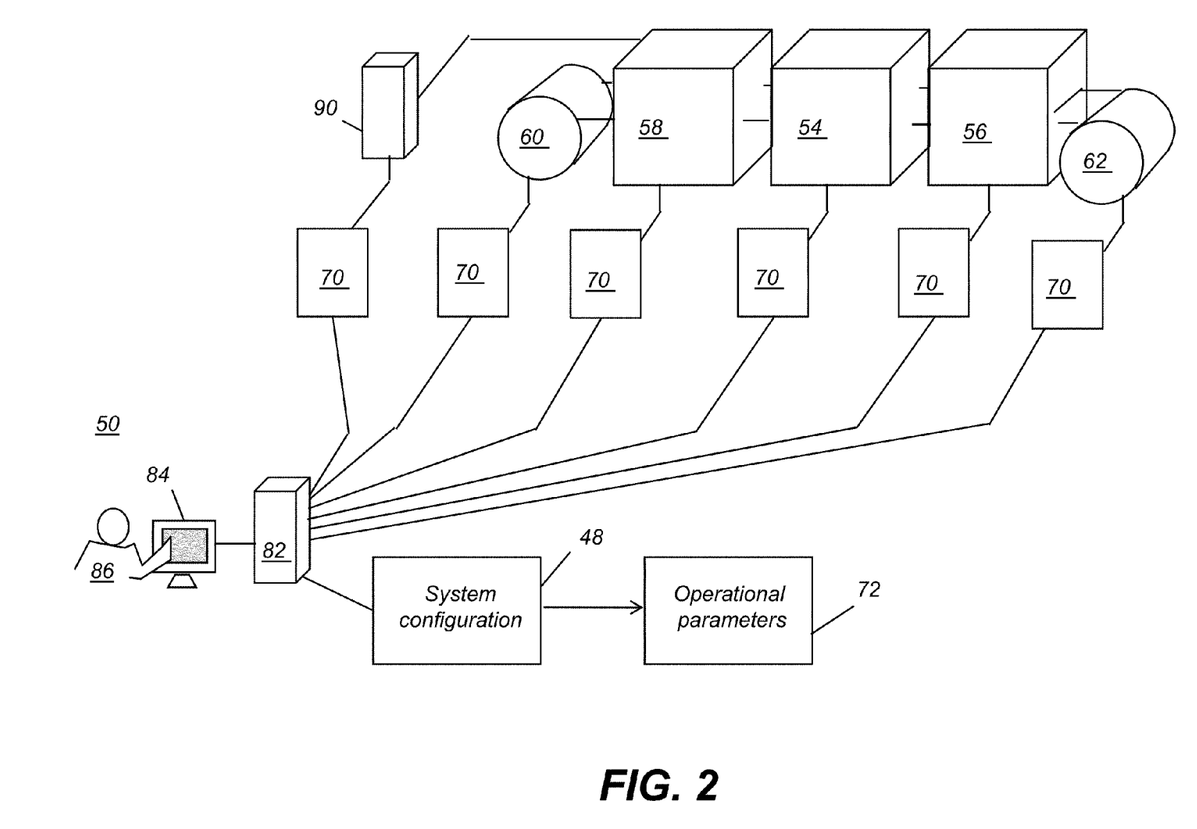
FIG. 2 is a schematic block diagram that shows the relationship of printing system modules and stored data to the generated system configuration.

The schematic block diagram of FIG. 2 shows a modular printing system 50 formed from an arrangement of different modules 54, 56, 58, 60, 62 and a modular raster image processor (RIP) 90. Each of the modules 54, 56, 58, 60, 62 has associated module configuration data 70.

For any particular module 54, 56, 58, 60, 62, a substantial portion of its module configuration data 70 does not change during operation or when the module is used with a different set of modules 54, 56, 58, 60, 62. Some portion of the module configuration data 70 can be variable, such as where data from sensors associated with the module 54, 56, 58, 60, 62 are provided. For example, a temperature sensor that lies within a dryer module can provide different temperature values during operation.

System Configuration Data

Still referring to FIG. 2, the collection of the current module configuration data 70 from each module 54, 56, 58, 60, 62 in the system is then used to define a system configuration 48. In the particular modular printing system 50 of FIG. 2, modular printing system 50 has three printing modules 58, 54, 56; a web media supply module 60, and a web media take-up module 62. Each module has associated module configuration data 70 as described earlier. A system controller 82, such as a computer or computer workstation or some type of dedicated logic control processor, is in data communication with each module and obtains the module configuration data 70 from each module 54, 56, 58, 60, 62, using this information to generate system configuration 48. System configuration 48 can be stored in processor-accessible memory 66 on system controller 82 or some other memory device. An operator 86 can then view and update the system configuration data on a display 84 in order to control the operation of modular printing system 50. System configuration 48 can store a considerable amount of information on the system's capabilities in view of the current set of modules 54, 56, 58, 60, 62.

Still referring to FIG. 2, a raster image processor (RIP) 90 can also be considered as a type of module, providing configuration data 70 and operational parameter data for the image data path of modular printing system 50. As described previously, RIP 90 can have a maximum processing or throughput speed for image data that can, in some cases, provide a constraint for print speed. Other data from RIP 90 can include metadata that is associated with the digital image data, for example.

Figure 3:
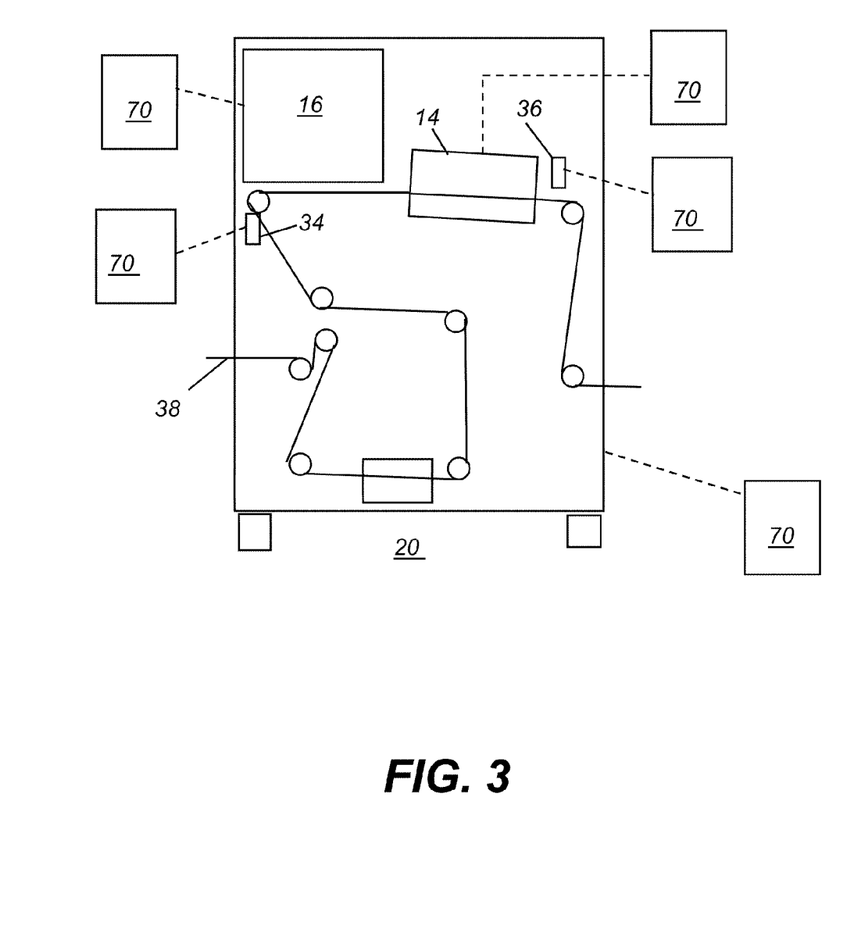
FIG. 3 is a schematic side view of modules within a digital printing apparatus according to an embodiment of the present invention.

In the FIG. 2 arrangement, each of modules 58, 54, 56, 60, and 62 is represented as a separate apparatus, in a separate chassis. It should be noted that modular design and associated storage of configuration data 70 can also apply for components within a single equipment chassis, as shown for module 20 in the example of FIG. 3. Digital print-head 16 also provides configuration data 70, as well as heater 14. In addition, sensors 34 and 36 also provide variable data from which module configuration data is determined, such as temperature, relative density of the applied colorant, web stiffness, humidity, and other variables. Sensors 34 and 36 are used to monitor print media 38 and ambient conditions within module 20. This data is similarly provided to system controller 82 (FIG. 2) and used to generate system configuration 48.

Operational Parameters

As noted previously, the information and parameter values in system configuration 48 are conditioned by the module configuration data 70. As one example, the speed of the modular printing system 50, in feet/minute (or other similar metric) is dependent on the speed ranges available with each of the individual modules 54, 56, 58, 60, 62 that form the system. Each of modules 54, 56, 58, 60, 62 has an operating speed or a range of speeds. The printing speed that is available from modular printing system 50 is the highest speed that each of the modules 54, 56, 58, 60, 62 can handle. This printing speed is provided and displayed as part of system configuration 48. As another example, one or another of the modules 54, 56, 58, 60, 62 can have a constrained media width capability. This value then determines the maximum web media width that is usable and provided as part of system configuration 48. As yet another example, capacity of a dryer module can limit the speed at which the modular printing system 50 can operate given a set of media and ink lay down requirements.

As examples like this show, the system configuration data that results from collecting module configuration data determines various operational parameters for the assembled printing system. Referring again to FIG. 2, operational parameters 72 include various settings and measured values associated with the arrangement of modules 54, 56, 58, 60, 62 in the current modular printing system 50. Operational parameters 72, derived from the system configuration 48, are used to operate the modular printing system 50 during printing and can include a host of parameters such as selected exhaust fan CFMs, media conveyance speed for an operation in process, dryer settings, media tensioning parameters, and measures of energy used. Operational parameters 72 can include parameters that are selectable to the operator or that define ranges of values that are operator-selectable. An operator interface, for example, can permit the operator to select from among a set of operational parameters for running a print job.

The data communication between system controller 82 and each of the modules 54, 56, 58, 60, 62 that form modular printing system 50, represented in FIG. 2, can take any of a number of forms, such as using cable interconnection, wireless communication, or networked connection, for example. Within the module 54, 56, 58, 60, 62 itself, configuration data 70 can be stored in a memory 66 and updated by a microprocessor or other controller during configuration and operation. Alternately, a module 54, 56, 58, 60, 62 can simply provide a configuration ID or link that is used to access further configuration information from a remote or centralized source, such as from a web page or other networked source. While FIG. 2 represents a point-to-point connection between each module 54, 56, 58, 60, 62 and system controller 82, other connection arrangements are possible, including arrangements that employ module-to-module communication.

Figure 4:
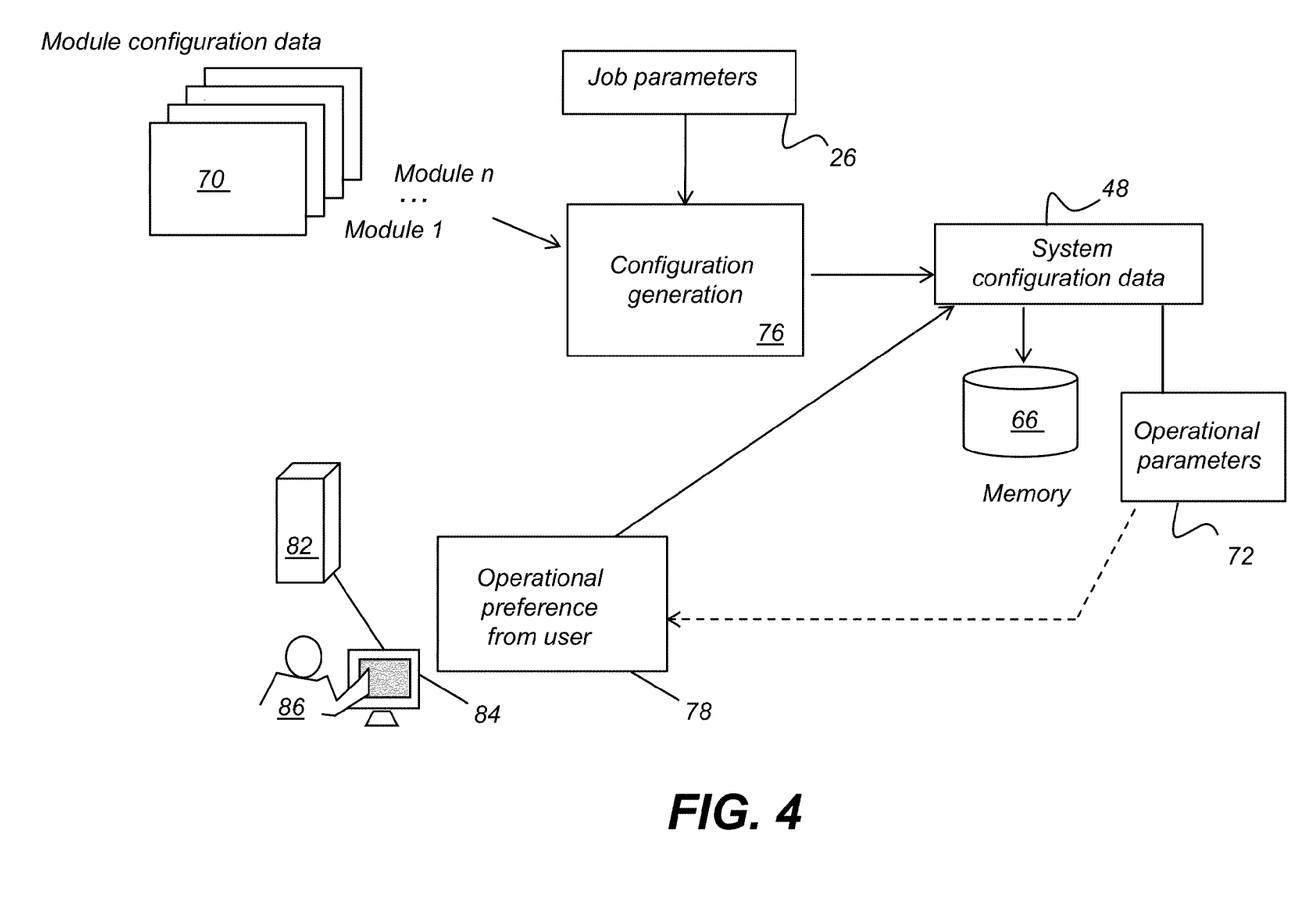
FIG. 4 is a logic flow diagram that shows a sequence for generation and storage of a system configuration.

The logic flow diagram of FIG. 4 shows how system configuration 48 and operational parameters 72 are generated in an embodiment of a modular printing system 50 having multiple modules 1 . . . n, such as is shown in FIGS. 1 and 2. Each of modules 1 . . . n provides its module configuration data 70 to a configuration generation process 76. This information can be transmitted automatically to system controller 82 (FIG. 2) upon power-up, as a type of self-identification process. Alternately, this data can be transmitted periodically, or as soon as data connection between the module 1 . . . n and the system controller 82 is available. Alternately, system controller 82 can request module configuration data 70 from one or more modules 1 . . . n, such as when requested from an operator 86, for example.

Configuration generation process 76 combines the module configuration data 70 and, optionally, job parameters 26 and generates system configuration data 48. Operational parameters 72 can then be obtained using the system configuration data 48 based on operator preferences for running a print job and based on environmental and other sensed data from the modular printing system 50. Operational parameters 72 can be displayed by a user interface 80 or stored for reference or use in computer-accessible memory 66. The range of selectable operational preference settings 78 are determined, by the system controller 82, from the associated configuration information 70 for each module 1 . . . n provided by the selectively interconnected modular printing system 50.

User Interface

In one embodiment, as shown by a dotted line in FIG. 4, the user interface 80 that is provided from system controller 82 is generated and adapted according to the system configuration data 48 and operational parameters 72. With this feature, the operator interface for the printing system differs between one configuration of modular components and another. Referring to FIG. 1, for example, the printing system 10 having the turnover mechanism module 30 at an appropriate downstream location can provide two-sided printing, for which additional operator information, selections, and settings over the single-sided printing case would be more appropriate. Various controls for finishing equipment can be provided where such optional modular components are used, but are not available as part of the operator interface when this equipment is absent or has one or more of its functions disabled.

Figure 5A:
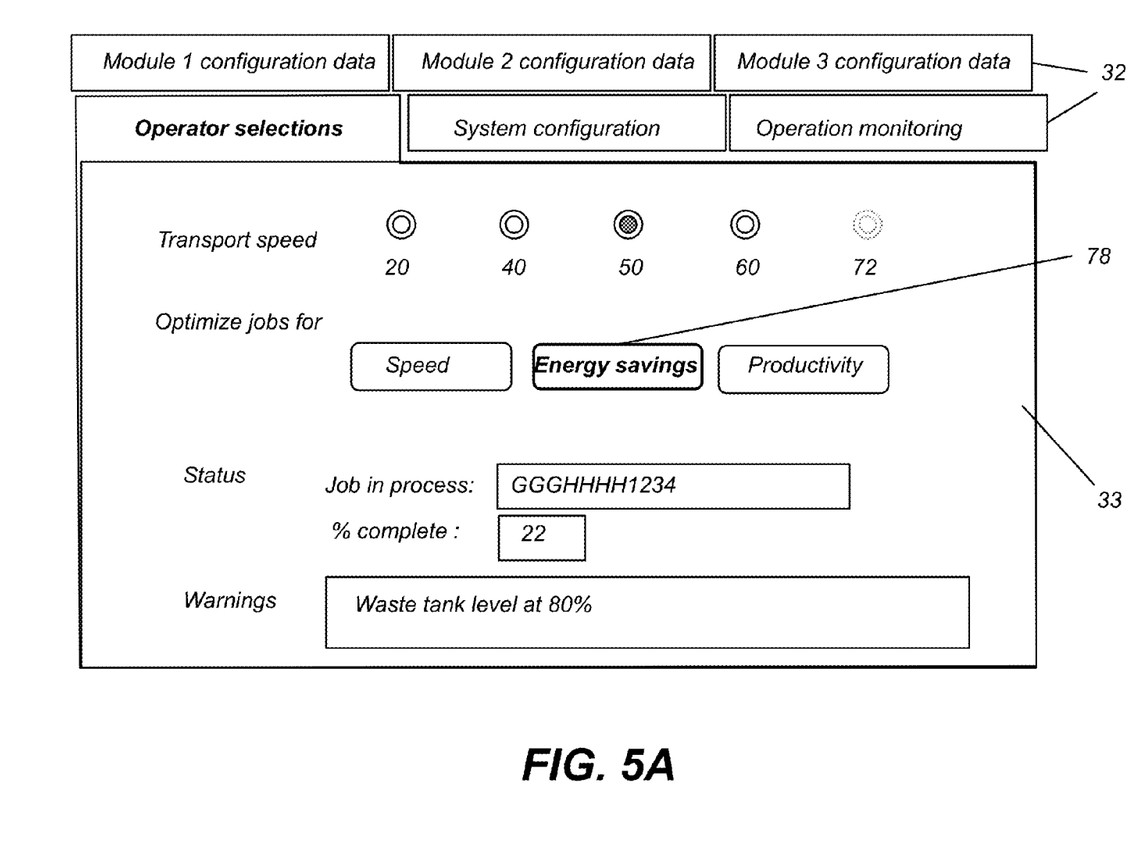
FIGS. 5A and 5B are plan views that show an example user interface screen using a standard tabbed-window arrangement.
Figure 5B:
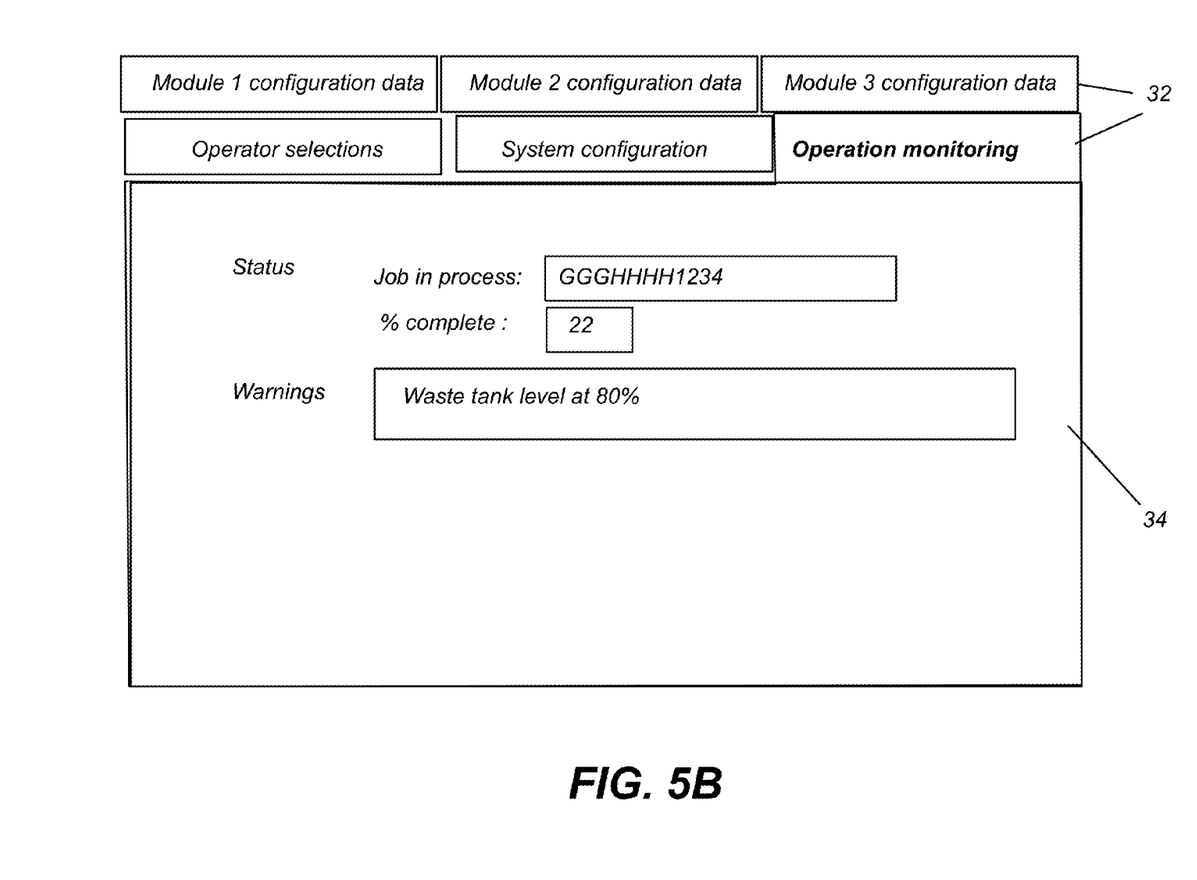

The plan views of FIGS. 5A and 5B show an example user interface 80 screen using a standard tabbed-window arrangement. A number of tabs 32 enable operator selection of functions for display in a corresponding window 33. In the embodiment shown, this user interface 80 provides access to module configuration data for one or more modules of the printing system and provides access to the resulting system configuration data that is generated according to the module configuration data 70.

Operator Preferences

Operator preferences for the printing system are conditioned by the modular composition of the system, so that specific operator preferences are enabled or disabled based on the modular and system configuration detected by system controller 82 and on the specific operational parameters 72 that are generated from system configuration data. In one embodiment, as shown in the example of FIG. 5A, the operator 86 can make a preference setting 78 that sets decision criteria for job handling, based on information that is obtained from the printing system modules and stored in the system configuration. The operator 86 can indicate, via user interface 80, a preference for increasing throughput, so that the job execution sequence is optimized for productivity, requiring little or no operator interaction with printing system 10 between jobs, such as changing media or adjusting operation variables. Alternately, the operator 86 can select a preference setting for a job sequence that reduces cost or energy utilization by operating at a speed that increases dryer efficiency. The operator 86 can have a range of selectable speed parameters available, based on media type, print speeds of various printing modules, transport speeds of finishing equipment, or other operational criteria. As a result the operator 86 can have a preference that relates to considerations of image quality, energy utilization, or throughput. As in some conventional systems, the operator 86 also has the option of reconfiguring operation of a module from the operator interface, such as to adjust desired web tensioning, for example.

Status information and warnings can also be provided as part of the user interface 80, as shown in FIG. 5B.

Workflow

The modular printing system of the present invention is further advantaged by improving workflow according to the modular arrangement of system components. Where there is a backlog of jobs, for example, the operator interface can give the operator the option to order jobs according to module setup, to help reduce required operator attention, adjustments, and reconfiguration between print jobs. Knowledge of the particular system configuration data for each job enables the system to automatically order jobs in sequence according to parameters such as media and ink types used, preferred operating temperature range for ink drying on a particular media type, and efficient sequences of operation and utilization for finishing equipment. This increases the throughput of the system and reduces the cost to operate it.

In one embodiment, the system configuration permits variable media transport speed from one job to the next and, in some cases, even within the same print job. Adapting the print drop rate to the media transport speed is described, for example, in commonly assigned U.S. Pat. No. 6,003,979 entitled "Gray Scale Printing with High Resolution Array Ink Jet" to Schneider et al. This would even permit acceleration (or, correspondingly, deceleration) of the web transport speed during the transition between jobs or even during printing within the same job. This would be useful, for example, where a portion of a print job must be printed at a slower speed, such as to achieve higher color density or where extended drying time is needed over specific pages of a job. Instead of requiring that the printing speed be constrained to the lowest speed required for a portion of the job, embodiments of the present invention permit printing system 10 to change print speeds within the job as needed. The capability to accelerate the media transport speed while printing can help to improve throughput in a number of ways, such as by adjusting speed over a portion of a print job according to print content. This system is particularly useful when printing books and multi-page compound documents that include, for example, many pages of black text interspersed with full color photographic images. The speed of the transport will increase if only black text is printed and decrease when full color photographs are printed. Also paperback books and magazines can be printed in proper sequence, facilitating in-line finishing, incorporating full color covers and mono-chromatic pages.

The invention has been described in detail with particular reference to certain preferred embodiments thereof, but it will be understood that variations and modifications can be effected within the spirit and scope of the invention.

PARTS LIST

10 Printing system
12 Source roller
14 Dryer
16 Digital print-head
18 Take-up roll
20 Module
22 Cross-track positioning mechanism
24 Tensioning mechanism
26 Job parameters
30 Turnover mechanism
32 Tab
33 Window
34 Sensor
36 Sensor
38 Print media
40 Module
48 System configuration
50 Modular printing system
52 Slack loop
54, 56, 58 Printing module
60 Media supply module
62 Take-up module
66 Memory
70 Configuration data
72 Operational parameter data
76 Configuration generation process
78 Preference setting
80 User interface
82 System controller
84 Display
86 Operator
90 RIP

The invention claimed is:

1. A method for configuring a modular printing system, having a plurality of modules that are configured to be selectively interconnected to form different printing system configurations comprising:
   providing printing system modules and associated configuration information for each module;
   selecting and interconnecting modules to produce a particular printing system configuration and communicating the associated configuration information for the selected modules to a system controller;
   using the system controller to automatically determine a printing system configuration that includes operational parameter ranges for at least one of the selected modules; and
   storing the printing system configuration so that the modular printing system is ready to operate.

2. The method of claim 1, providing a user interface wherein operational parameters ranges for at least one of the selected modules are displayed to the user.

3. The method of claim 1 further including automatically determining at least one operational parameter based on the system configuration data of the modular printing system.

4. The method of claim 1 further including using exact constraint web handling to provide web transport through the plurality of modules that are configured to be selectively interconnected.

5. The method of claim 3 wherein the operational parameters including: media porosity, media tensile strength, exhaust fan flow rate, media conveyance speed, dryer settings, media tensioning parameters, or measures of consumed energy.

6. The method of claim 2, wherein the user selects an operational parameter from the range of operational parameters.

7. The method of claim 1, wherein all the configuration information provided by each module to the controller is stored by the module.

8. The method of claim 1, wherein the configuration information provided by the module to the controller has a configuration code that is used to access further configuration information from another source.

9. The method of claim 1 further including providing modules including: a media supply, media, marking components, marking engines, environmental conditioning units, or media finishers.

10. The method of claim 6 further including providing digital print data and metadata associated with the digital print data to the system controller.

11. The method of claim 1 wherein the system configuration information include: module type, module capabilities, module requirements, or module order.

* * * * *